Aug. 23, 1927.
H. L. FISHER
1,639,766
FISH LURE
Filed March 15, 1927    2 Sheets-Sheet 1
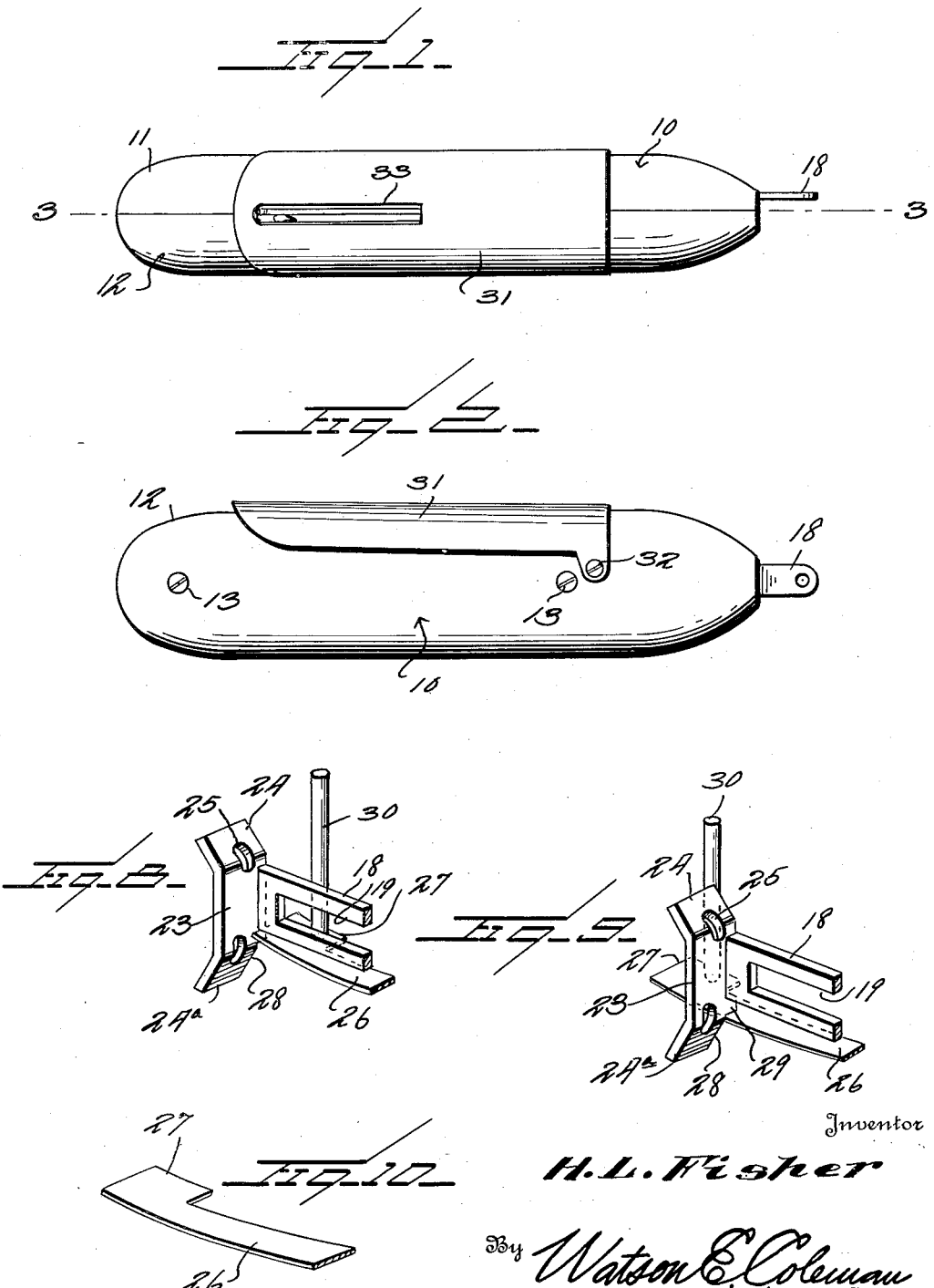

Aug. 23, 1927.
H. L. FISHER
1,639,766
FISH LURE
Filed March 15, 1927   2 Sheets-Sheet 2
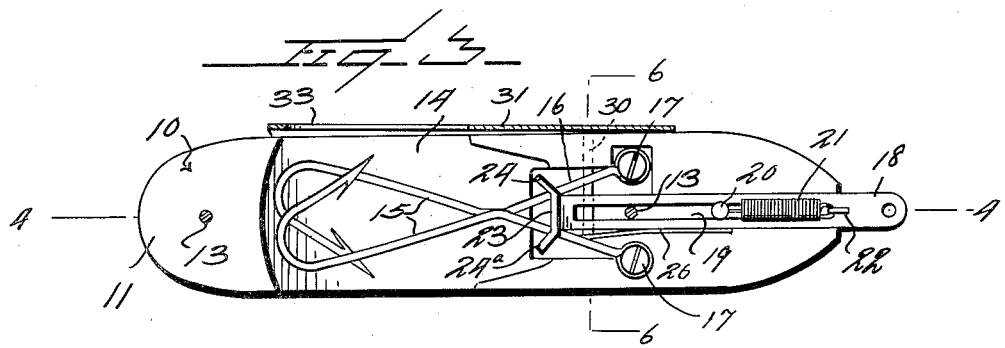
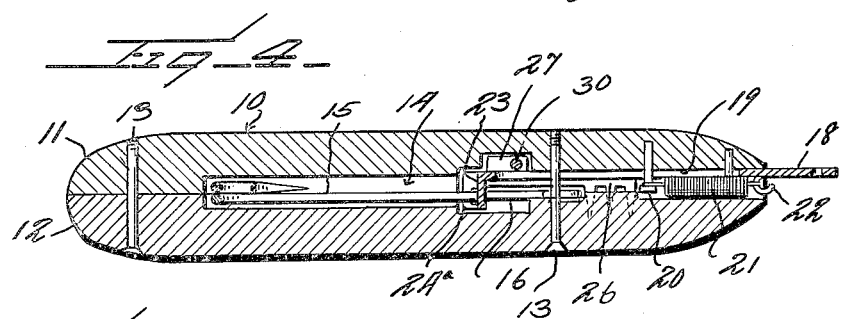
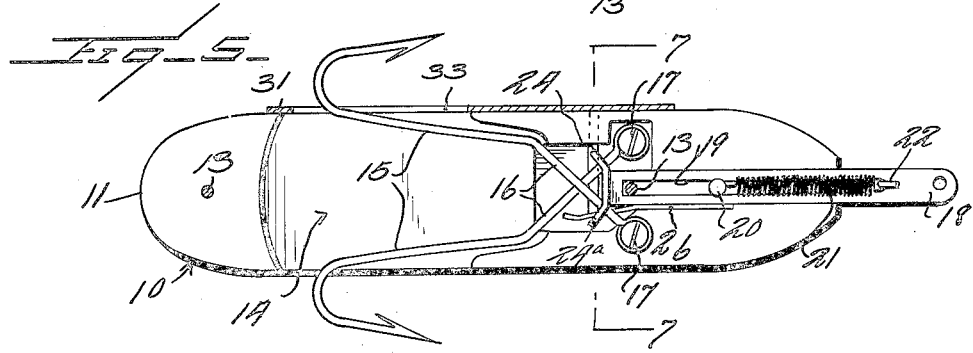
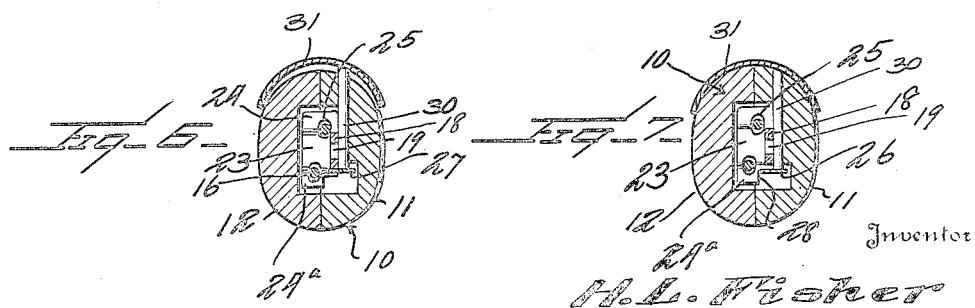

Patented Aug. 23, 1927.

1,639,766

UNITED STATES PATENT OFFICE.

HARRY L. FISHER, OF MUSCATINE, IOWA.

FISH LURE.

Application filed March 15, 1927. Serial No. 175,589.

This invention relates to fish lures and particularly to those lures which have disposed within the body of the lure one or more hooks, normally retracted within the body of the lure but projectable into the fish when the lure is taken.

In all lures of this character known to me, the hooks are projected upon strain being placed upon the line as, for instance, by the fish grabbing the lure, but one of the objections to this construction is that when the lure is cast and the line runs out, the inertia of the reel or the jerk given to the line when it stops, or a pull upon the line for any cause, acts to project the hooks which remain projected and, as a consequence, if the fish does not strike the lure is drawn back with the hooks projected and is, therefore, very liable to snag.

The general object of the present invention is to provide a lure of this character having hooks normally concealed within the body of the lure but projected by the direct action of the tension upon the line, the hooks being retained in a rigid, outwardly projected position so long as the tension on the line continues, it thus being the case that the greater the tension on the line imposed by the pull, the deeper or more firmly embedded will the hooks become.

Another object in this connection is to provide a latching means normally holding the hooks from projection by the tension on the line but acting as soon as the fish has struck or grabbed the bait between its jaws, to release the hooks and permit the tension on the line to project the hooks.

A further object is to provide resilient means acting to retract the hooks as soon as the tension upon the line is slackened so that should the fish fail to be engaged by the hooks and the tension upon the line ceases, the hooks will be automatically returned within the body of the device and the device is automatically reset to its latched position so that there is no chance of the lure being snagged when it is being retracted or recovered for the next cast.

A still further object is to provide a construction of this character so formed as to permit the hooks to be readily retracted from the fish when it is desired to remove the fish from the lure.

My invention is illustrated in the accompanying drawings wherein:—

Figure 1 is a top plan view of a lure constructed in accordance with my invention.

Fig. 2 is a side elevation of the lure;

Fig. 3 is a side elevation of the lure with one-half section thereof removed;

Fig. 4 is a section on the line 4—4 of Figure 3;

Fig. 5 is a like view to Figure 3 but showing the hooks projected.

Fig. 6 is a section on the line 6—6 of Figure 3;

Fig. 7 is a section on the line 7—7 of Figure 5;

Fig. 8 is a fragmentary perspective view showing the hook yoke and a portion of the shank thereof and the latching spring;

Fig. 9 is a like view to Figure 8 but showing the latch sprung or released;

Fig. 10 is a perspective view of the latching spring.

Referring to these drawings it will be seen, particularly from Figure 4, that the body 10 of the lure, which may be of any suitable character or design, is preferably formed of two sections 11 and 12, these sections being shown as being engaged with each other by the pins or screws 13 passing through the two sections. Each section 11 or 12 is recessed upon its inner face, as at 14, so as to provide a cavity within the lure within which the hooks and hook actuating mechanism is disposed. The hooks 15 each has a shank which is angularly bent at 16, these angular portions of the shanks crossing each other, as shown in Figure 5, and the extremities of the shanks being formed with eyes through which the pivot screws 17 pass. Thus, the hooks may be shifted into the position shown in Figure 3 where the hooks are entirely retracted or projected, as in Figure 5.

For the purpose of projecting the hooks when strain comes upon the line, I provide a longitudinally extending shank 18 at the forward end of the lure, which shank is slotted, as at 19, for the passage of the adjacent pin or screw 13 and for the passage of a pin 20. A coiled contractile spring 21 is attached at one end to the pin 20 and at the other end to this shank 18, as at 22. This shank projects out beyond the nose or forward end of the lure and is perforated for attachment to a fishing line.

The inner end of the shank carries upon it the offset yoke 23, which yoke is angularly bent at its ends, as at 24, and these wings 24 are slotted, as at 25, the slots extending into the middle or straight portion of the yoke, as shown clearly in Figures 8 and 9. The shanks 16 of the hooks pass through these apertures 25 and it will be obvious that when the shank 18 is drawn toward the right in Figure 3, that the yoke will cause the positive projection of the hooks, as shown in Figure 5, and that when the shank is drawn toward the left, as by the action of spring 21, the yoke 23 will cause the retraction of the hooks.

For the purpose of latching the parts in the position shown in Figure 3, so as to prevent the projection of the hooks until a fish has grasped the lure in its jaws, I provide the spring detent or latch 26 which, as shown in Figure 10, has its extremity laterally widened, as at 27. The lower wing 24ᵃ is cut away, as at 28, see Figures 8 and 9, to provide a shoulder 29 and the extremity of the latch normally engages just above this cut away portion, as shown in Figure 8.

Impinging against the widened portion 27 of the latch 26 is a pin 30 which, as shown in Figures 6 and 7, extends upward through one of the sections as, for instance, the section 11, to the exterior of the lure and bears against the inner face of a longitudinally extending, transversely curved trigger 31 in the form of a plate or strip of metal having ears 32 at one end which are pivoted by screws, pins, or other suitable means, to the body of the lure. This trigger plate 31 is longitudinally slotted, as at 33, so as to permit the projection of one of the hooks, as shown in Figure 5. This trigger plate is normally disposed as in Figure 3, in spaced relation to the lure and the latch 26 at this time is in the position shown in Figure 8 so as to prevent longitudinal movement of the sliding shank 18 under strain. If now a fish strikes the lure or, in other words, grabs the lure in its jaws, this will cause the depression or inward movement of the latch 26 and the inward movement of the pin 30 will cause the trigger 31 to pass below the shoulder 29 defining the cut away portion, and the instant that this has occurred, any strain on the line will cause the shank 18 to move forward and cause the projection of the hooks into the fish. If for any reason the hooks should not catch the fish and thus there should be no strain upon the line or the strain be released, the spring 21 will draw the body of the lure forward with relation to the shank 18 and the hooks will be again entirely retracted within the lure.

It will be seen that in operation the hooks remain permanently within the body of the device when the bait is being cast and recovered. When, however, the fish strikes, the jaws of the fish depress the trigger plate, unlocking the mechanism and the hooks are instantly projected into the fish by the tug or pull exerted by the fish, the inevitable result being the complete hooking or gaffing of the fish. Should the fish in some manner fail to become gaffed or hooked, the mechanism will instantly and automatically reset itself. The hooks will be returned or retracted within the body of the lure and the latch will again engage the yoke 23, thus making the device absolutely snagless during the recovery of the bait. When the fish is caught by the hooks and is landed, the hooks may be readily retracted from the fish by inward pressure upon the device accompanied by a light pressure upon the forward end of the shank 18 which will, of course, cause the retraction of the hooks.

It will be seen that this latch which I have provided prevents any projection of the hooks when the bait is being cast or when the device comes on contact with resistance of any kind which produces a pull upon the line. The hooks cannot be projected by a pull upon the line except after the depression or upon a depression of the trigger plate and this can only be accomplished by the strike of a fish.

I claim:—

1. A fishing lure comprising a hollow body having a slot communicating with the interior of the body, a hook pivoted within the body and swingable outward through said slot to projected position, means constantly urging the hook to a retracted position entirely within the body, a sliding shank within the body adapted to be connected to a fishing line and engaging the hook and causing the projection of the hook through said slot when strain is placed upon the line and the shank is shifted relative to the body in one direction, means latching the sliding shank in a retracted position, and means acting to release the latching means when a fish has grabbed the lure.

2. A fishing lure comprising a hollow body having a slot communicating with the interior of the body, a hook pivoted within the body and swingable outward through said slot to projected position, means constantly urging the hook to a retracted position entirely within the body, a sliding shank within the body adapted to be connected to a fishing line and engaging the hook and causing the projection of the hook through said slot when strain is placed upon the line and the shank is shifted relative to the body in one direction, and means acting to release the latching means when a fish has grabbed the lure including a trigger mounted upon the exterior of the lure.

3. A fishing lure comprising a hollow body having a slot communicating with the interior of the body, a hook pivoted within the body and swingable outward through said slot to projected position, means constantly urging the hook to a retracted position entirely within the body, a sliding shank within the body adapted to be connected to a fishing line and causing the projection of said hook through said slot when strain is placed upon the line and the shank is shifted relative to the body in one direction, and means acting to release the latching means when a fish has grabbed the lure including a transversely curved trigger plate fitting the body of the lure.

4. A fishing lure comprising a hollow body having a slot communicating with the interior of the body, a hook pivoted within the body and having a shank formed with an angular portion, a longitudinally shiftable shank disposed within the body and projecting from the forward end thereof and adapted to be connected to a fishing line, a spring resisting forward movement of the sliding shank, means carried by the shank engaging the angular shank of the hook and causing the projection of the hook through said slot when the shank is pulled relative to the body, means latching the shank in a retracted position, and a trigger plate mounted upon the exterior of the body and conforming thereto and adapted when shifted against the body to release said latching means to permit the projection of the hook.

5. A fishing lure comprising a hollow body having a slot communicating with the interior of the body, a hook pivoted within the body and having a shank formed with an angular portion, a longitudinally shiftable shank disposed within the body and projecting from the forward end thereof and adapted to be connected to a fishing line, a spring resisting forward movement of the sliding shank, means carried by the shank engaging the angular shank of the hook and causing the projection of the hook through said slot when the shank is pulled relative to the body, a resilient latch engaging the shank and preventing forward movement of the shank, a trigger plate mounted upon the exterior of the body and conforming thereto, and a pin carried by the trigger plate and extending into the body and bearing against the spring latch whereby as the trigger plate is closed toward the body, the latch will be retracted.

6. A fishing lure comprising a hollow body having opposed slots communicating with the interior of the body, a pair of hooks having angularly disposed shanks and pivoted within the body, the hooks being projectible through said slots, a longitudinally extending shank slidably mounted within the body and extending out the forward end thereof and adapted to be connected to a fishing line, means carried by said shank engaging the angular shanks of the hooks and acting as the sliding shank is pulled forward to cause the movement of the hooks in opposite directions to projected positions, a spring resisting forward movement of the shank and constantly urging the shank and hooks to a retracted position, a spring latch operatively engaging the shank and holding it retracted, and a trigger plate mounted upon the exterior of the body and conforming thereto and operatively connected to said latch, the trigger plate when closed against the body releasing the latch to permit the projection of the hooks.

7. A fishing lure including an approximately cylindrical body, hooks normally retracted within the body, means automatically projecting said hooks when strain is placed upon the body, locking means preventing the projection of the hooks, and means for releasing said locking means to permit the projection of the hooks and including a trigger member mounted upon the exterior of the body and adapted to be depressed against the body by a fish grabbing the lure, said trigger member being transversely curved to fit the body and extending nearly the entire length of the body and being pivotally connected to the body adjacent one end.

In testimony whereof I hereunto affix my signature.

HARRY L. FISHER.